United States Patent [19]
Ledstrom et al.

[11] 3,860,274
[45] Jan. 14, 1975

[54] PIPE COUPLING

[76] Inventors: Richard L. Ledstrom, 3465 County Rd., Long Lake, Minn. 55429;
Lloyd M. Teeuwen, 2016 Mendelssohn Ave., Minneapolis, Minn. 55427

[22] Filed: July 2, 1973

[21] Appl. No.: 375,591

[52] U.S. Cl. ................................ 285/312, 285/320
[51] Int. Cl. ........................ F16l 37/00, F16l 37/18
[58] Field of Search ........... 285/312, 320, 308, 309, 285/310, 311

[56] References Cited
UNITED STATES PATENTS

| | | | |
|---|---|---|---|
| 533,761 | 2/1895 | Walker et al. | 285/312 X |
| 3,383,123 | 5/1968 | Murray | 285/312 X |
| 3,633,948 | 1/1972 | Dickey | 285/312 |

Primary Examiner—Richard J. Scanlan, Jr.
Attorney, Agent, or Firm—Schroeder Siegfried Ryan & Vidas

[57] ABSTRACT

An improved pipe coupling formed of telescopic parts in which a sealing member is positioned therebetween and is carried by one of the parts in a recessed shoulder portion remote from the flow passage therethrough to prevent wear and introduction of sealing material into the flow passage.

8 Claims, 4 Drawing Figures

PATENTED JAN 14 1975 3,860,274

PIPE COUPLING

Our invention relates to pipe couplings or a conduit coupling member and more particularly to an improved pipe coupling in which the sealing member is positioned remote from the flow passage therethrough.

Detachable coupling members for connecting conduits or pipes are well recognized and known. Such couplings may connect rigid or flexible pipe members with the couplings being formed normally in two parts which telescopically fit together, each part being rigidly secured to the pipe sections which are to be coupled together. Such pipes are adapted to convey or transport fluids, that is liquids or granular solids, under pressure, either from a pumping or pneumatic action. In prior constructions, it is conventional to apply a sealing ring or surface of a sealing gasket material between the parts to insure an air or liquid tight seal. Cam lock members are conventionally employed between such coupling parts to hold the same in telescopic relationship with the sealing ring positioned therebetween. The interior surface of the coupling is normally contiguous with the interior of the conduit but where irregularities appear, such as raised surfaces or exposure of gasket material to the flow passage, the abrasive character of granular material under pressure is such as to cause wear of metal and sealing material resulting in the breakdown of the seal and producing seal material and metal contamination of the granular material being transported. In the prior construction, the seal is either positioned directly exposed to the flow passage and its abrasive effects or is positioned to one side of the same with a spacing between the coupling parts so that the seal material will be similarly attacked by the abrasive characteristics of the fluid material to present contamination and undo seal wear. Thus resulting metal wear and seal wear in couplings of this type limit the application of such couplings to liquids and require excessive maintenance and present contamination problems where granular material is being transmitted through the coupling.

In the present invention, an improved coupling is provided in which the sealing material is housed in one of the coupling parts remote from the flow passage, and the parts which are held together in telescopic relationship by cam levers will be moved to close abutting relationship such that a minimum or no exposure is presented to the sealing material while a positive seal is provided. Similarly, the flow passages through the coupling are of uniform dimension to provide a complete, unobstructed flow passage with the minimum opportunity for metal wear from the coupling parts and elimination of the seal wear because of the location of the seal member. The latter is recessed in an internal shoulder in one of the coupling parts such that it is contacted by the external shoulder of the other coupling part in a telescopic relationship permitting a close or contacting metal relationship between the coupling parts on all surfaces thereof recessing the seal but effectively sealing the coupling parts with an air or fluid type coupling.

It is therefore the object of this invention to provide an improved detachable coupling with sealing ring.

Another object of this invention is to provide an improved pipe coupling with the sealing ring removed from the interior surface of the coupling.

Another object of this invention is to provide an improved pipe coupling in which a smooth uniform metal surface is provided through the coupling with the sealing member removed therefrom so that neither metal protrusions or exposure of the sealing member are subject to attack by material flowing through the coupling.

Another object of this invention is to provide in an improved coupling, an arrangement of parts in which the seal member and the coupling itself is not susceptable to wear by abrasive material flowing therethrough.

These and other objects of this invention will becomeapparent from the reading of the become apparent description, together with the drawings wherein.

Figure 1:
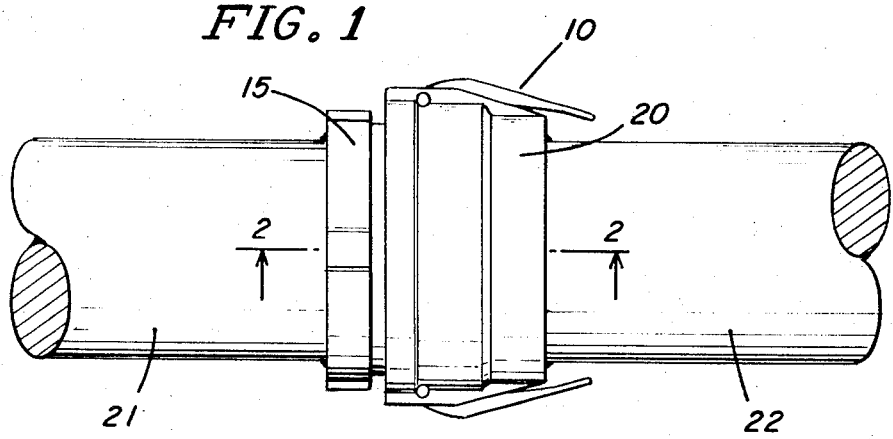
FIG. 1 is an elevation view of the coupling with conduit or pipe members attached thereto.

In FIG. 1 an improved coupling member is shown generally at 10. It incorporates coupling members or parts 15 and 20 which are adapted to connect detachably and selectively conduit members or pipes 21 and 22. As will be best seen in FIGS. 2 and 3, coupling part or member 15 are generally cylindrical in construction and has a first inner cylindrical surface 25 which is positioned adjacent one end of the coupling part and extends intermediate of the coupling part. The outer edge of the coupling part 15 has a recessed or shoulder portion 26 in which is positioned the conduit or pipe 21 with the conduit or pipe being held therein through braising and/or welding, such as is indicated at 28. The pipe or conduit 21 may incorporate a threaded surface and shoulder portion 26 may include a threaded surface for a threaded pipe coupling if desired. The interior dimension of the conduit 21 is of the same dimension of the inner cylindrical surface 25 of the coupling member or part 15 to provide a smooth, continuous flow passage therethrough. The member 15 has a shoulder section 30 positioned external of the coupling member with reinforced hub sections behind the same which may be used in connecting the conduit thereto through screw means positioned therein. Positioned in the external shoulder portion 30 is an annular or circular groove 32. The forward extremity of the shoulder is preferably beveled as at 33. The coupling member or part may be made of aluminum or other suitable metallic material and is adapted to telescopically fit into the coupling member 20 as will be hereinafter defined.

Coupling member or part 20 has a short inner cylindrical surface 35 of the same diametrical dimension as the surface 25 such that in an assembled relationship, the surfaces 25 and 35 will provide a smooth flow passage through the coupling. The surface 35 is positioned intermediate the extent of the coupling part and an inner recessed shoulder section or portion 38 is positioned to one side of the same with a second recessed shoulder portion 39 to the other side of the same. The recessed portion 39 is adapted to receive and mount the pipe or conduit 22 which is suitably secured to the member 20 by means of welding, such as is indicated at 28, braising, threading or other means. The interior dimension of the conduit or pipe 22 will preferably be of the same interior dimension as the surface 35 to provide a generally smooth and uniform diametrical dimension flow passage from conduit 21 to conduit 22 through the coupling parts exposed thereto. The internal shoulder 38 is of an internal diametrical dimension to be slightly larger than the external diametrical dimension of the shoulder portion 30 on the member 15 such that the parts may be fitted together in telescopic relationship with the shoulder portion 30 ftting into the shoulder portion 38 of the member 20. A pair of projecting flange members 40 and 42 are formed integrally on diametrically opposed points on the external cylindrical surface of the member 20 and these have channel shaped recesses therein to fit and mount a pair of lever members 45, 46 therein. The lever members 45, 46 are pivoted in the flange members 40, 42, and in the slotted or recessed portions thereof through suitable pivot pins 48, 49. Lever members have cam surfaces 50 thereon which are eccentric so that when the levers are moved to a position where the handle portions are away from the coupling, the cam portions will be clear from the groove 32 or shoulder portion 38 to permit entrance of the shoulder 30 of the coupling member 15. As the lever members are pivoted to a position where the handle portions are disposed adjacent the coupling parts and within the recesses of the flanges 40, 42, the eccentric portions are rotated and extend into the shoulder portion 38 to coincide with the groove 32 in the shoulder portion 30 of the member 15 with the rotation urging the parts into a telescopic relationship and such that the shoulder portion 30 bears against the face of the shoulder portion 38 in member 20.

Positioned in the coupling member or part 20 and common to the internal shoulder portion 38, is a sealing groove recess 55. The recess is defined by a pair of parallel sides which form an angle to the normal or perpendicular sides of the shoulder portion 38 and extend angularly within the shoulder 38 to provide an angular groove generally rectangular in cross section and joined to the sides of the internal shoulder 38 in the member 20 and at the corner thereof. The groove is open at one surface and will be exposed to the bevel or the leading end of the external shoulder portion 30 of the coupling member 15, and a suitable annular sealing member 60 is positioned in the sealing groove to be engaged thereby.

Figure 2:
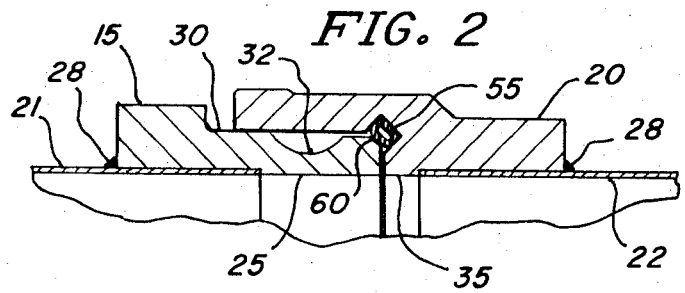
FIG. 2 is a sectional view of a portion of the coupling taken along the lines 2—2 in FIG. 1.
Figure 4:
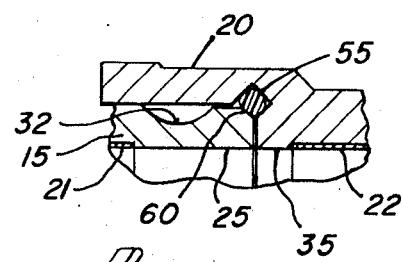
FIG. 4 is a fragmentary section view similar to that of FIG. 2 showing an alternate embodiment of the sealing member.
Figure 3:
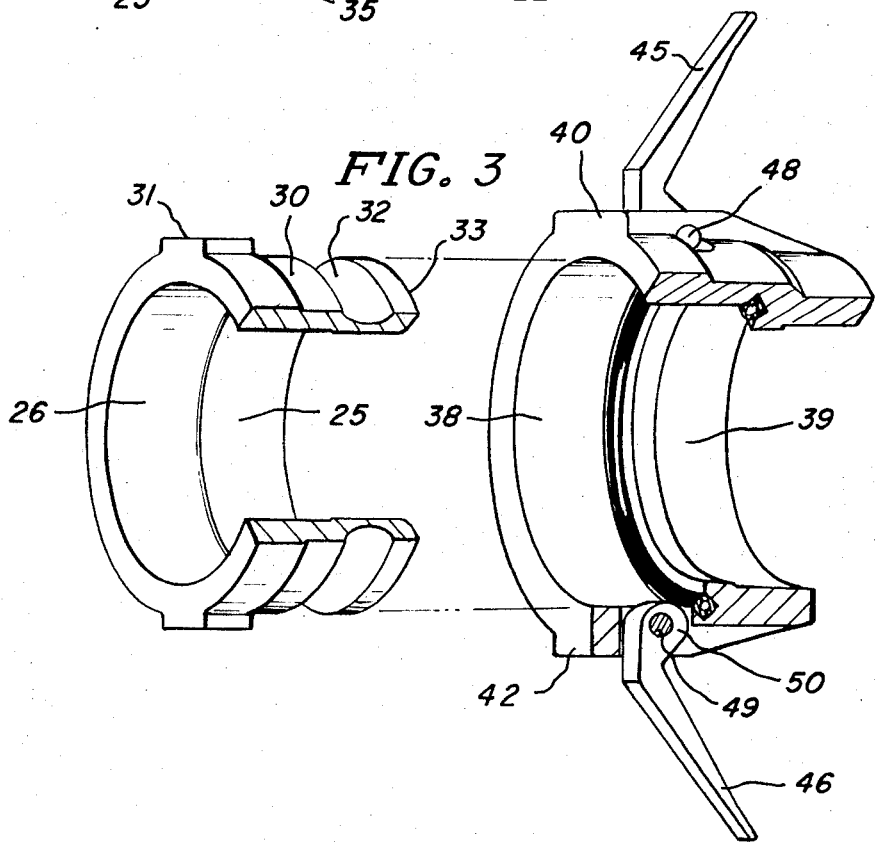
FIG. 3 is an exploded view of the coupling with parts broken away showing the location of the sealing member therein.

In FIG. 2, the sealing ring 60 is shown as a hollow "O" ring which substantially fills the recess 55 and when engaged by the forward edge of the coupling member 30 at the shoulder portion 30, will act to provide a seal between the coupling parts around the inner periphery of the juncture of the telescopic parts. In FIG. 4 this sealing member is shown as solid in cross section defining an "O" ring type structure which is similarly engaged by the coupling part or member 15 or the shoulder portion 30 thereof to be deformed substantially filling the recess 55 and effecting a seal about the inner periphery of the coupling parts or members 15 and 20. The inner edge of the coupling member 15 which may or may not be beveled as at 33 will engage or deform the sealing member 60 allowing the coupling members or parts 15 and 20 to fit snugly together in a telescopic relationship and providing a minimum of gap surface therebetween, as indicated in FIGS. 2 and 4. Rotation of the cam or lever members 45, 46 will cause the eccentric cam surface 50 to bear against the groove 32 in the coupling member 15 urging the same inwardly in a telescopic manner against the sealing member 60 so that the minimum clearance will be provided therebetween. With the improved sealing arrangement and the location of the sealing member in the improved coupling, the sealing material or sealing member 60 is positioned remote from the normal flow surface through the coupling defined by the surfaces 25, 35 and the interior of the conduits 21 and 22. Thus the flow of granular material, such as sugar, sand and grain or any abrasive material, while causing normal wear within the pipes will encounter no projecting or obstruction surface to incur abnormal metal wear. Similarly, the recessed sealing member is positioned remote from the flow passage and with a minimum of gap tolerance leading thereto so that it cannot be attacked by the abrasive material and caused to deteriorate or introduce sealing material into the material being transmitted through the coupling and conduits.

An improved liquid tight or air tight seal is provided for this arrangement which enables a readily detachable to connectable coupling in a pneumatic type conduit transmission systems for food and abrasive materials which significantly improves the life of the same and prevent contamination of the material being transmitted by the introduction of metal and sealing material thereto. The improved coupling is readily detached and connected through operation of the levers pivoting the same to an extended position for detachment and to a retracted position with the parts in telescopic relationship for a solid fluid type coupling. This improved pipe coupling requires a minimum of maintenance and is easy to use and maintain.

Therefore, in considering this invention it should be remembered that the present disclosure is illustrative only in the scope of the invention and should be determined by the depended claims.

What is claimed is:

1. Pipe coupling comprising: a pair of members adapted to be connected respectively to conduit members and to detachably couple and seal the same at said coupling; one of said members telescopically fitting into the other of said members to be sealed therein, said one member having an internal cylindrical surface of predetermined dimension with an external shoulder portion and a circular grooved surface positioned in said external said shoulder portion, said other member having an internal shoulder portion adjacent an internal cylindrical surface of the same predetermined dimension as the internal cylindrical surface of said one member; said internal shoulder portion of the other member being adapted to receive in telescopic relationship the external shoulder portion of said one member; a recessed groove positioned in the internal shoulder portion of said other member between the sides of said internal shoulder portion; a sealing ring positioned in said recessed groove and being contacted by a surface of the external shoulder portion of said one member which projects into the recessed groove; and cam levers pivoted on said other member and having eccentric cam surface thereon adapted to be rotated through said other member and into the circular grooved surface of said one member to bring said members together in a telescopic and near abutting relationship and against the sealing ring to seal the coupling.

2. The pipe coupling of claim 1 in which the recessed groove mounting the sealing ring is rectangular in cross section and positioned at the corner of the internal shoulder of said other member.

3. The pipe coupling of claim 1 in which the recessed groove is removed from the internal cylindrical surface of predetermined dimension of the members.

4. The pipe coupling of claim 1 in which an outer peripheral edge of the external shoulder portion of said one member defined by the end of said one member and the forward edge of said outer peripheral surface of the shoulder portion thereof bear against the sealing ring positioned in the recessed groove of said other member.

5. The pipe coupling of claim 1 in which the sealing ring is a solid "O" ring.

6. The pipe coupling of claim 1 in which the sealing ring is a hollow "O" ring.

7. The pipe coupling of claim 1 in which the sides of the recessed groove are parallel to one another and at an angle to the sides forming the internal shoulder in said other member and at the intersection of said side surfaces.

8. The pipe coupling of claim 1 in which the sealing ring is positioned remote from the internal cylindrical surfaces of said first and second member.

* * * * *

UNITED STATES PATENT OFFICE
CERTIFICATE OF CORRECTION

Patent No. 3,860,274　　　　　　　　　　Dated January 14, 1975

Inventor(s) Richard L. Ledstrom and Lloyd M. Teeuwen

It is certified that error appears in the above-identified patent and that said Letters Patent are hereby corrected as shown below:

Column 2, line 10, delete "comeapparent" and insert - come apparent-

Column 2, line 10, delete "become appar-"

"　　　line 11, delete "ent" and insert - attached -

Signed and sealed this 11th day of March 1975.

(SEAL)
Attest:

RUTH C. MASON
Attesting Officer

C. MARSHALL DANN
Commissioner of Patents
and Trademarks